United States Patent
Okorocha

(10) Patent No.: US 6,441,976 B1
(45) Date of Patent: Aug. 27, 2002

(54) LENS SYSTEM HAVING COMPLIANT OPTIC MOUNTING STRUCTURE

(75) Inventor: Livyn O. Okorocha, Cincinnati, OH (US)

(73) Assignee: Corning Precision Lens, Inc., Cincinnati, OH (US)

( * ) Notice: Subject to any disclaimer, the term of this patent is extended or adjusted under 35 U.S.C. 154(b) by 0 days.

(21) Appl. No.: 09/855,963

(22) Filed: May 15, 2001

(51) Int. Cl.[7] .................................................. G02B 7/02
(52) U.S. Cl. ...................................... 359/820; 359/819
(58) Field of Search ................................ 359/811, 819, 359/820, 823; 313/35, 36, 44; 348/745, 749

(56) References Cited

U.S. PATENT DOCUMENTS

| | | | |
|---|---|---|---|
| 1,250,820 A | 12/1917 | Dyer et al. | 359/808 |
| 3,083,773 A | 4/1963 | Nagel et al. | 166/176 |
| 3,757,031 A | 9/1973 | Izraeli | 174/138 |
| 4,371,594 A | 2/1983 | Ohara et al. | 429/97 |
| 4,405,161 A | 9/1983 | Young et al. | 285/80 |
| 4,460,245 A | 7/1984 | Shimizu | 350/253 |
| 4,510,215 A | 4/1985 | Adam | 429/99 |
| 4,526,440 A | 7/1985 | Lundberg et al. | 350/257 |
| 4,612,680 A | 9/1986 | Daiguji | 14/22 |
| 4,688,337 A | 8/1987 | Dillner et al. | 24/616 |
| 4,693,555 A | 9/1987 | Arai et al. | 350/253 |
| 4,776,681 A | 10/1988 | Moskovich | 350/432 |
| 4,806,440 A | 2/1989 | Hahs, Jr. et al. | 429/100 |
| 5,056,197 A | 10/1991 | Cohen | 24/304 |
| 5,202,706 A | 4/1993 | Hasegawa | 359/819 |
| 5,214,533 A | 5/1993 | Moracchini | 359/367 |
| 5,249,082 A | 9/1993 | Newman | 359/813 |
| 5,276,555 A | 1/1994 | Sansbury | 359/826 |
| 5,488,514 A * | 1/1996 | Bruning | 359/811 |
| 5,576,895 A | 11/1996 | Ikeda | 359/811 |
| 5,577,836 A | 11/1996 | Vent et al. | 362/61 |
| 5,577,855 A | 11/1996 | Leyden et al. | 403/291 |
| 5,617,259 A | 4/1997 | Inoue | 359/820 |
| 5,652,680 A | 7/1997 | Kashihara et al. | 359/819 |
| 5,653,550 A | 8/1997 | Mutz et al. | 403/329 |
| 5,678,953 A | 10/1997 | Usui et al. | 403/329 |
| 5,877,583 A * | 3/1999 | Meligo et al. | 313/35 |
| 6,196,755 B1 | 3/2000 | Okorocha et al. | 403/313 |
| 6,104,554 A * | 8/2000 | Bodurek, Jr. et al. | 359/820 |
| 6,115,082 A * | 9/2000 | Rudolph | 348/749 |
| 6,285,416 B1 | 9/2001 | Mitchell et al. | 348/745 |

* cited by examiner

Primary Examiner—Loha Ben
Assistant Examiner—Saeed Seyrafi
(74) Attorney, Agent, or Firm—Wood, Herron & Evans, L.L.P.

(57) ABSTRACT

A projection television lens cell and system including a tubular optic support structure having an interior with a longitudinal central axis. A first annular support surface extends around the longitudinal central axis for receiving a first optic having an outer circumferential edge. The first annular support surface includes at least a first resilient member configured to contact the outer circumferential edge of the first optic and to be moved in a radially outward direction by the first optic relative to the longitudinal central axis. The resilient member assists in preventing substantial movement of remaining portions of the tubular optic support structure, for example, during assembly and any heat induced thermal expansion of the optic in use.

22 Claims, 4 Drawing Sheets

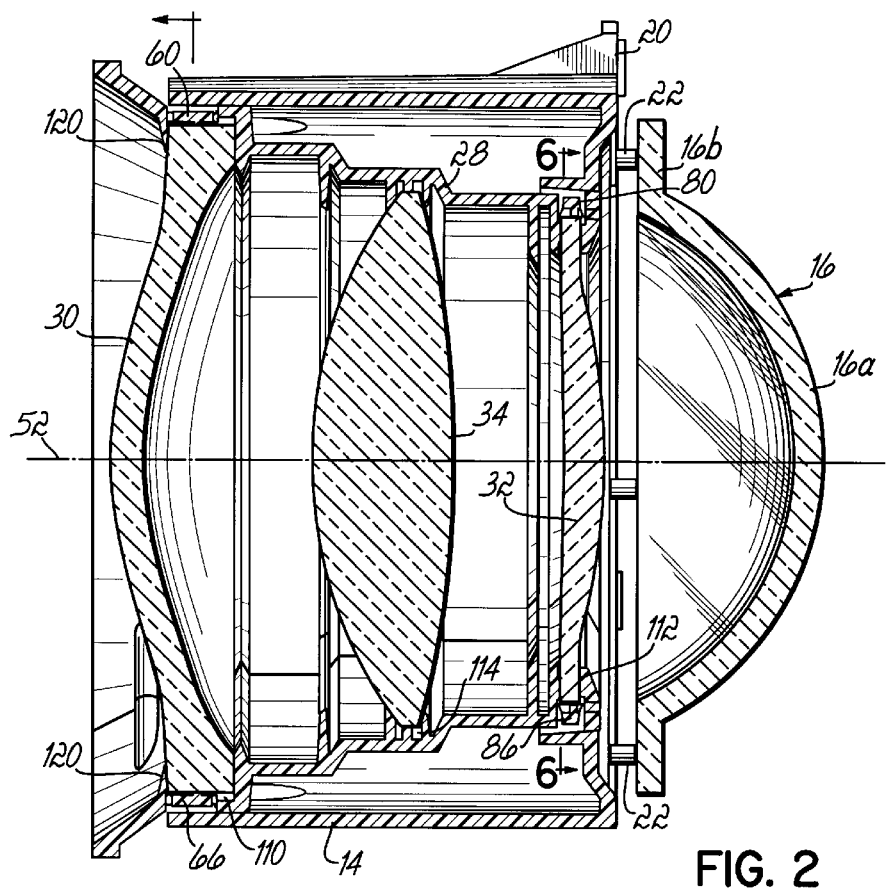
FIG. 2
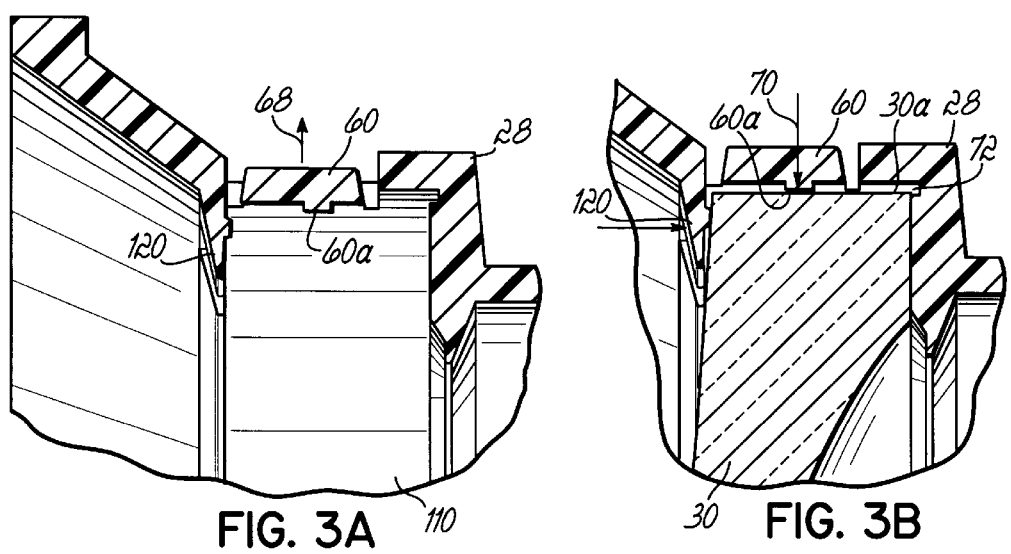
FIG. 3A  FIG. 3B

LENS SYSTEM HAVING COMPLIANT OPTIC MOUNTING STRUCTURE

FIELD OF THE INVENTION

The present invention generally relates to optical lens assemblies and, more particularly, to lens assemblies especially useful in projection televisions.

BACKGROUND OF THE INVENTION

A projection television set typically includes three cathode ray tubes (CRTs), corresponding to the colors red, blue and green. A projection lens assembly uses a plurality of optics, which are typically plastic or glass elements, to magnify the image appearing on the CRT faceplate and project that image onto a much larger viewing screen. Typical CRTs used in projection televisions typically have a diameter of 3 to 9 inches. The image projected onto the screen generally has a size ranging from 40 to 60 inches or larger measured diagonally. Each of the CRTs must provide maximum brightness or light intensity and, to facilitate this objective, each CRT operates at maximum power to produce maximum light output at the faceplate while still maintaining color balance. As a result, the CRTs generate considerable heat within the enclosure of the projection television set. It is not uncommon for the ambient temperature in the interior of the television set to be elevated by 40° C. to 45° C. or more above room temperature.

Each CRT has an associated magnifying lens system mounted adjacent to the CRT faceplate. In one illustrative system, the lens assembly is formed with at least one "A" optic or element, at least one "B" optic or element and at least one "C" optic or element. Regardless of the number of optics, these are generally referred to in the art as "A", "B" and "C" optic groups. That is, each "group" may be comprised of one or more optics. The "B" optic group usually includes an optic formed of glass, while the "A" and "C" optic groups may be formed of plastic, such as a molded acrylic plastic. However, it should be understood that each group may comprise one or more optics formed of glass and one or more optics formed of plastic.

There may be various types of forces exerted on an optic or by an optic that can lead to undesirable changes in the optical properties of the optic. Plastic optics are especially prone to thermal expansion due to heating by, for example, an associated CRT. As a result, the optic support structure can cause a thermally expanded optic to distort. Also, optics can distort due to forces exerted during assembly. This is also particularly true of plastic optics. Due to the physical changes in one or more of these optics, the focus of the lens system can change. The picture displayed on the television screen could then become blurred as a result of the defocusing effect of these types of optic distortions. Problems of this type are becoming even more acute and numerous as thinner optics are used in lens systems.

For at least these reasons, there is a continuing need for lens assemblies which address the effect of heat induced and/or assembly related focusing problems while, for example, maintaining relatively low cost and complexity associated with manufacturing the lens assemblies.

SUMMARY OF THE INVENTION

The present invention generally provides a lens cell, especially useful in projection televisions, including a tubular optic support structure having an interior with a longitudinal central axis and a first annular support surface extending around the longitudinal central axis. This first annular support surface receives a first optic having an outer circumferential edge. The first annular support surface includes at least one resilient member configured to contact the outer circumferential edge and to be moved in a radially outward direction, relative to the longitudinal central axis, by the first optic. The compliant or resilient nature of this member assists in preventing substantial movement of or forces on remaining portions of the tubular optic support structure by the optic. This feature is especially helpful during assembly of the lens cell and during use of the lens cell in a heated environment, such as a projection television cabinet, which causes the optic to thermally expand. The force exerted by the resilient member or members is not enough to distort the optic but is enough to retain the optic in a stationary condition within the optic support structure.

The first annular support surface is preferably positioned within a groove in the interior of the optic support structure and the circumferential edge of the first optic is received in the groove. Although the resilient member may be any member which facilitates the intended function, such as metal springs, separate rubber or other elastomeric inserts or molded rubber or elastomeric members, the preferred structure is a flexible tab member in the form of a cantilever. More preferably, four cantilevered members are used at equidistant, spaced locations surrounding the first optic. These members are molded into the wall of the tubular optic support structure.

The resilient member or members, such as the flexible tab members used in the preferred embodiment, provide a preload on the first optic by being resiliently biased in a radially outward direction when the first optic is assembled within the tubular optic support structure. That is, the resilient member or members move in a radially outward direction and then bear against the circumferential edge of the optic to provide a force directed radially inward against the optic. When that optic expands during use due to heat generated by the CRT or another heat source, the thermal expansion of the optic is accommodated by the resilient member or members without inducing further significant stress on remaining portions of the optic support structure.

In the preferred embodiment, the lens system includes four optics, however, many configurations and different numbers of optics may be used instead. In the preferred assembly, at least the plastic optics are mounted within structure including one or more resilient members for mounting each optic, as discussed generally above.

Additional objectives, advantages and features of the invention will become more readily apparent to those of ordinary skill in the art upon review of the following detailed description of the preferred embodiments, taken in conjunction with the accompanying drawings.

BRIEF DESCRIPTION OF THE DRAWINGS

FIG. 2 is a cross sectional view taken along the central longitudinal axis of the lens cell taken from the system shown in FIG. 1.

FIG. 3A is an enlarged view of a resilient mounting member of the invention without the optic.

FIG. 3B is an enlarged cross sectional view similar to FIG. 3A but showing the optic assembled with the optic support structure and resilient member.

DETAILED DESCRIPTION OF THE PREFERRED EMBODIMENT

Figure 1:
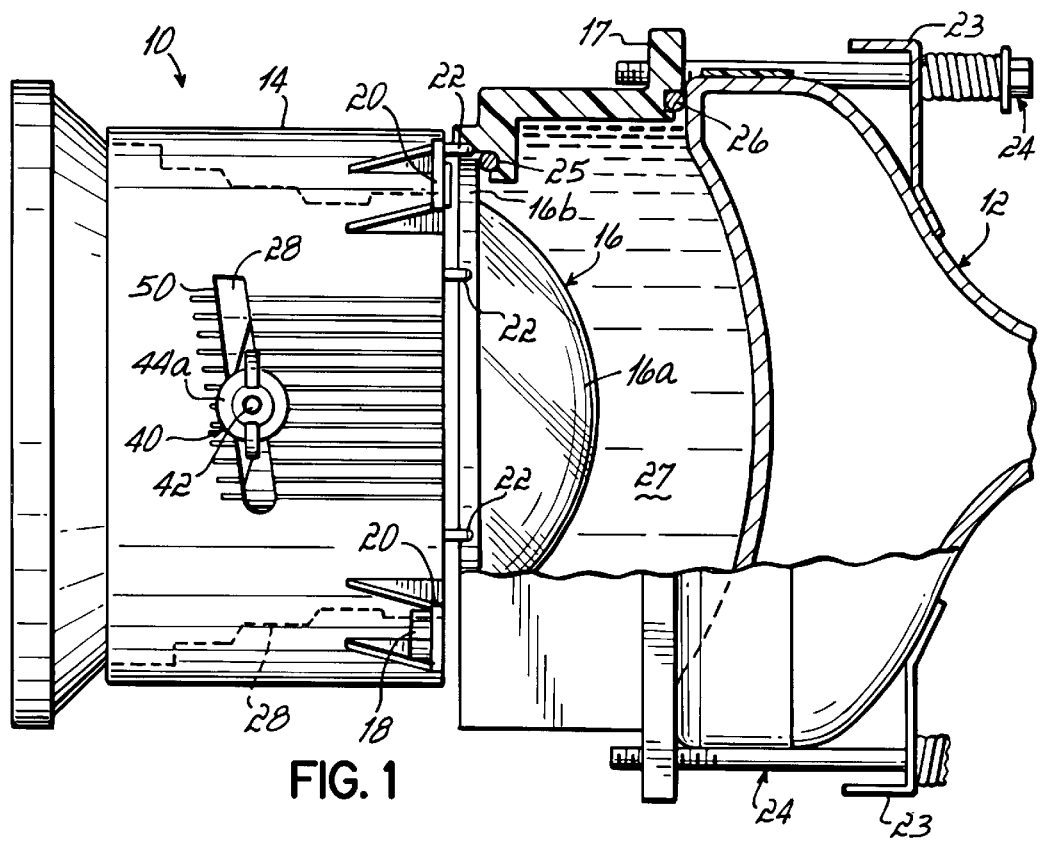
FIG. 1 is a side elevational view of a lens system constructed in accordance with the invention and partially fragmented to show certain interior details thereof.

Referring generally to FIGS. 1 and 2, lens system 10 is constructed in accordance with a preferred embodiment of the invention, although it will be understood that other configurations may be utilized within the spirit and scope of the invention. The lens system 10 is specifically suitable for use in projection televisions sets and will typically be used in conjunction with a CRT 12 associated with one of the colors red, green or blue. The lens system 10 includes an outer, generally cylindrical focus mount 14. The lens assembly includes a "C" optic 16 referred to in the art as a field flattener. The focus mount 14 is mounted within the interior of the television set (not shown) through the use of a mounting member or coupler 17 and is secured to the coupler 17 by suitable fasteners 18 and flange elements 20. The field flattener or "C" element 16 is fixed between the focus mount 14 and the coupler 17 and is located in a centered position by pins 22. The "C" optic 16 is formed from a clear plastic as is conventional in the art and has a convex surface 16a facing the CRT 12.

As further shown in FIG. 1, the CRT 12 is mounted against coupler 17 by a bracket 23 and spring-loaded fastener assemblies 24. O-rings 25, 26 are respectively positioned between a flange portion 16b of "C" element 16 and the coupler 17 and between the CRT 12 and the coupler 17. This forms a space 27 between the "C" element 16 and the CRT 12 for receiving a liquid coolant as is conventional.

Referring more specifically to FIG. 2, an optic supporting structure or lens cell 28 carries three optics including an "A" element 30, a "B" element 34, and a B/C corrector element 32. Corrector 32, which is closest to the "C" element 16, is formed from clear plastic as is the "A" element 30. The larger, centrally located "B" element 34 is formed from glass and provides the majority of the positive magnifying power to the lens system 10. As mentioned above, each of these elements may be referred to as a group in the industry, and may or may not include multiple optics. Referring back to FIG. 2, it will be appreciated that the CRT 12 directs light initially through the "C" optic 16 and then through the respective corrector element 32 and "B" element 34 and finally the "A" element 30 before the light and resulting image is received by the television screen (not shown) positioned on a side of the lens system 10 opposite to the CRT 12.

Figure 4:
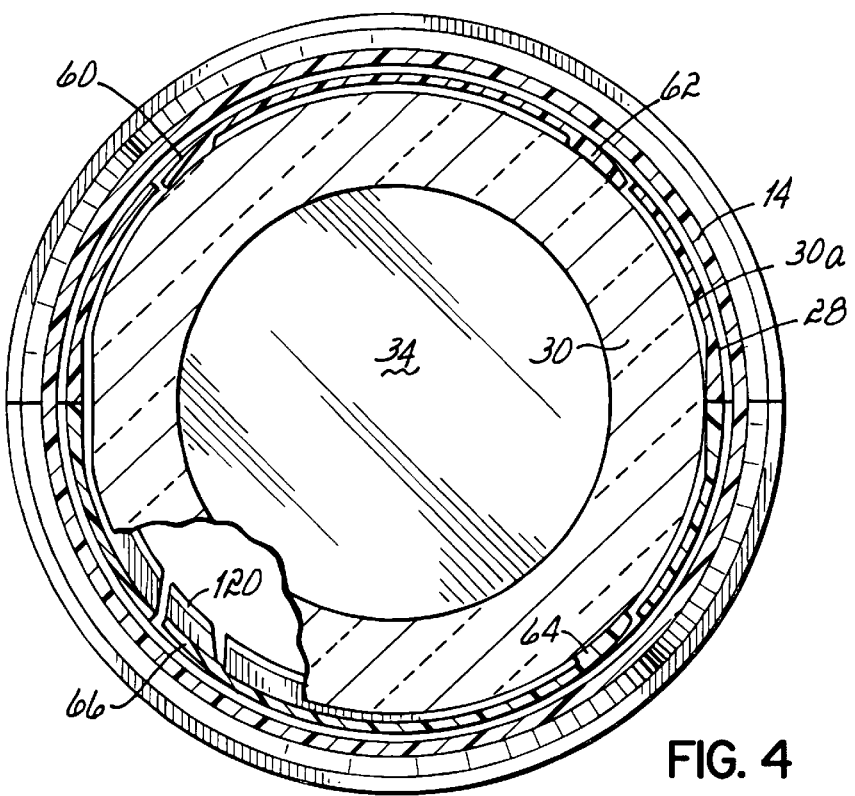
FIG. 4 is a cross sectional view taken generally along line 4—4 of FIG. 2.

The lens cell 28, including optics or elements 30, 32, 34, may be manually adjusted in an axial manner in left or right directions as viewed in FIGS. 3 and 4 relative to the "C" optic 16. This is an initial adjustment typically made at the factory during the manufacturing process. To facilitate this adjustment, as shown in FIG. 1, a fastener assembly 40 comprising an externally threaded fastener 42 and a nut assembly 44 couples focus mount 14 to lens cell 28. Fastener 42 extends through a slot 50 in the focus mount 14. The nut assembly 44 is loosened allowing the focus mount 14 to rotate relative to the lens cell 28. As shown in FIG. 2, the slot 50 extends at a nonperpendicular angle relative to the axis 52 (FIG. 2) of the lens system 10. Therefore, as the focus mount 14 is rotated, the fastener 42 moves along the axis 52 and thereby moves the lens cell 28 and optics 30, 32, 34 along the axis 52 either toward or away from the CRT 12 depending on the direction of rotation. Once the proper focus has been set in this manner, the nut assembly 44 is tightened and the distance between the respective optics or elements 30, 32, 34 relative to the "C" optic 16 is fixed.

Referring now to FIGS. 3A, 3B and 4, four equally spaced resilient members 60, 62, 64, 66 are provided on lens cell 28. These members 60, 62, 64, 66 take the form of cantilevers movable generally radially outward and radially inward with respect to the central longitudinal axis 52 shown in FIG. 2. As best shown in FIGS. 3A and 3B, each resilient member 60, 62, 64, 66 is configured identically and, therefore, a detailed description and view of one member will suffice. Thus, as particularly shown in FIG. 3A, member 60 includes a projection 60a for contacting a circumferential edge 30a of optic 30 (FIG. 3B). Resilient member or tab 60 is normally disposed in the position shown in FIG. 3A, but may be moved in the direction or arrow 68 against a counteracting radially inward directed biasing force. Thus, when optic 30 is inserted into lens cell 28 during assembly, tab 60 moves radially outward to the position shown in FIG. 3B thereby exerting a radially inward force in the direction of arrow 70 against circumferential edge 30a. This facilitates an interference fit of optic 30 in lens cell 28. After assembly, a space 72 exists between remaining portions of the adjacent interior wall of lens cell 28 and circumferential edge 30a. Therefore, any additional thermal expansion of optic 30 in a radially outward direction will be accommodated by space 72 and will only cause flexible tab 60 to move further in a radially outward direction. The radial dimension or height, as viewed in FIG. 3B, of space 72 is chosen such that it exceeds the maximum expected thermal expansion of optic 30 in that direction. In this manner, lens cell 28 will exert radial forces against optic 30 with resilient members 60, 62, 64, 66 as opposed, for example, to any other optic mounting structure which would tend to bind optic 30 or prevent expansion and thereby cause optic distortion.

Figure 5:
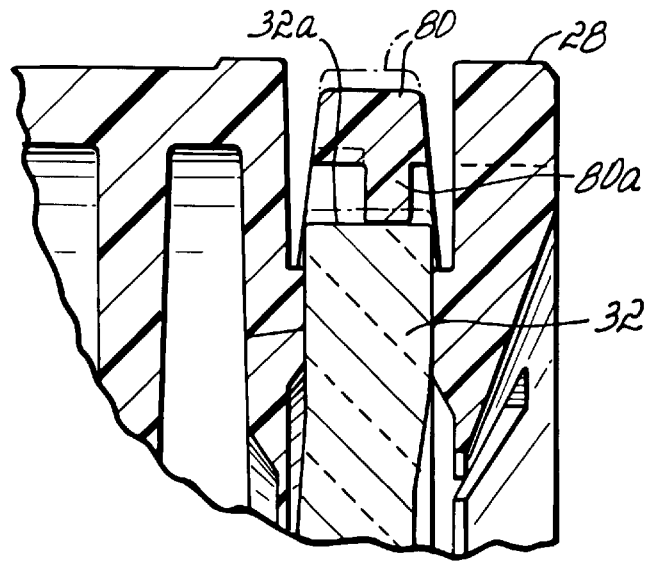
FIG. 5 is an enlarged cross sectional view similar to FIG. 3B, but showing another optic assembled in the optic support structure and in contact with another resilient member thereof.
Figure 6:
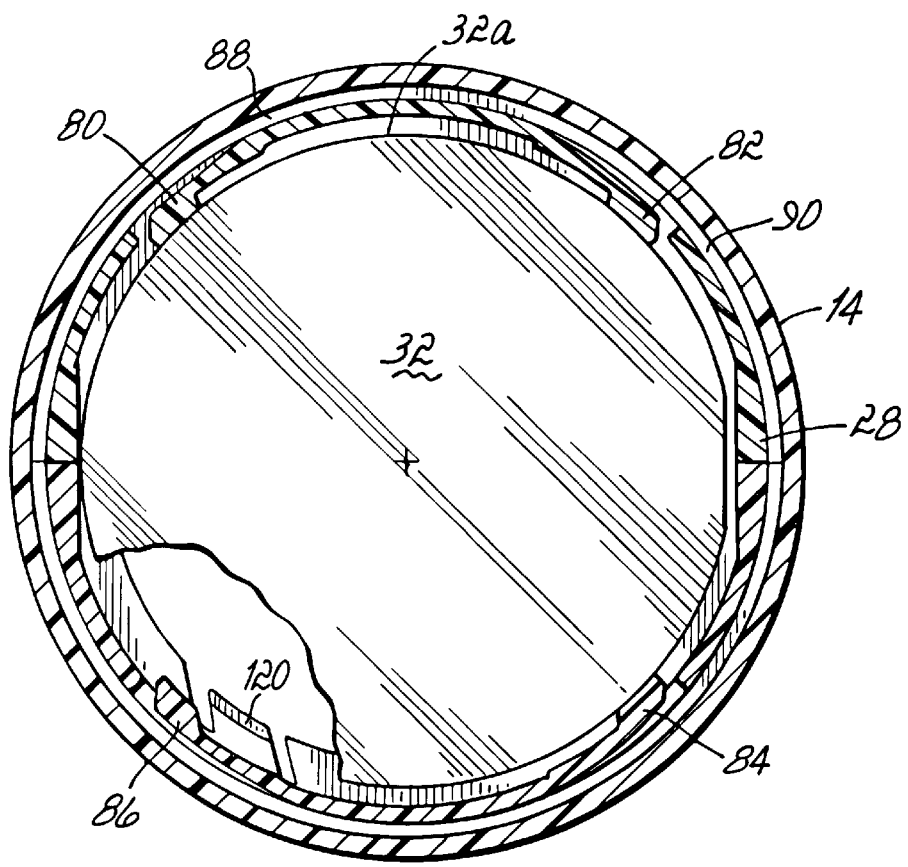
FIG. 6 is a cross sectional view taken generally along line 6—6 of FIG. 2.

Turning now to FIGS. 5 and 6, optic 32 is mounted within lens cell 28 in a manner similar to that described above with respect to optic 30. As shown best in FIG. 6, four equally spaced flexible tab members 80, 82, 84, 86 extend radially inward to form the contact points with the circumferential edge 32a of optic 32. This leaves a space 88 around the remaining circumferential portions of optic 32. As with optic 30, and the description provided above, each flexible tab member 80, 82, 84, 86 moves radially outward when optic 32 is assembled within lens cell 28. Thus, four equal radially inward directed retention forces are exerted on optic 32 at locations spaced 90° apart corresponding to the spacings of flexible tab members 80, 82, 84, 86. As further shown in FIG. 5, when optic 32 undergoes heat induced thermal expansion in the radially outward direction, flexible tab member 80 can move from the position shown in solid lines to the position shown in phantom lines. The same situation occurs with each of the other flexible tab members 82, 84, 86 to help ensure that binding does not occur between lens cell 28 and optic 32 which might cause optic distortion and defocusing of lens system 10. A sufficient spacing 90 is left between the flexible tab members 80, 82, 84, 86 and focus mount 14 to ensure that the maximum thermal expansion of optic 32 may occur without tab members 80, 82, 84, 86 contacting focus mount 14 during expansion.

Figure 8:
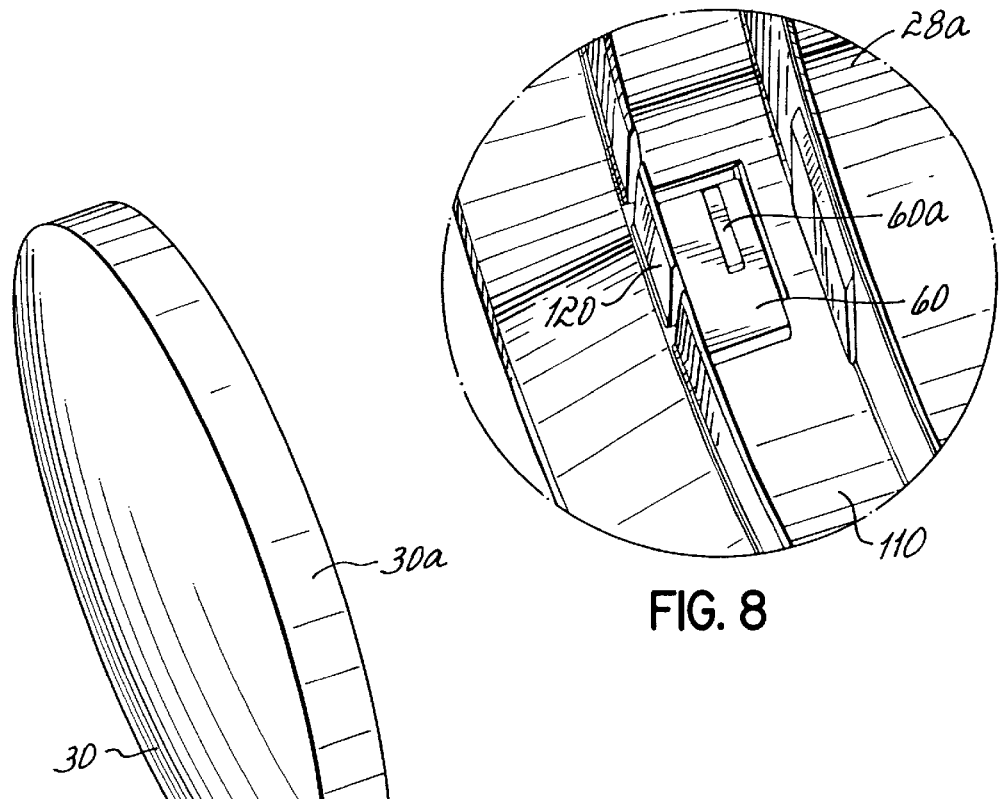
FIG. 8 is an enlarged view of the encircled portion 8 shown in FIG. 7.
Figure 7:
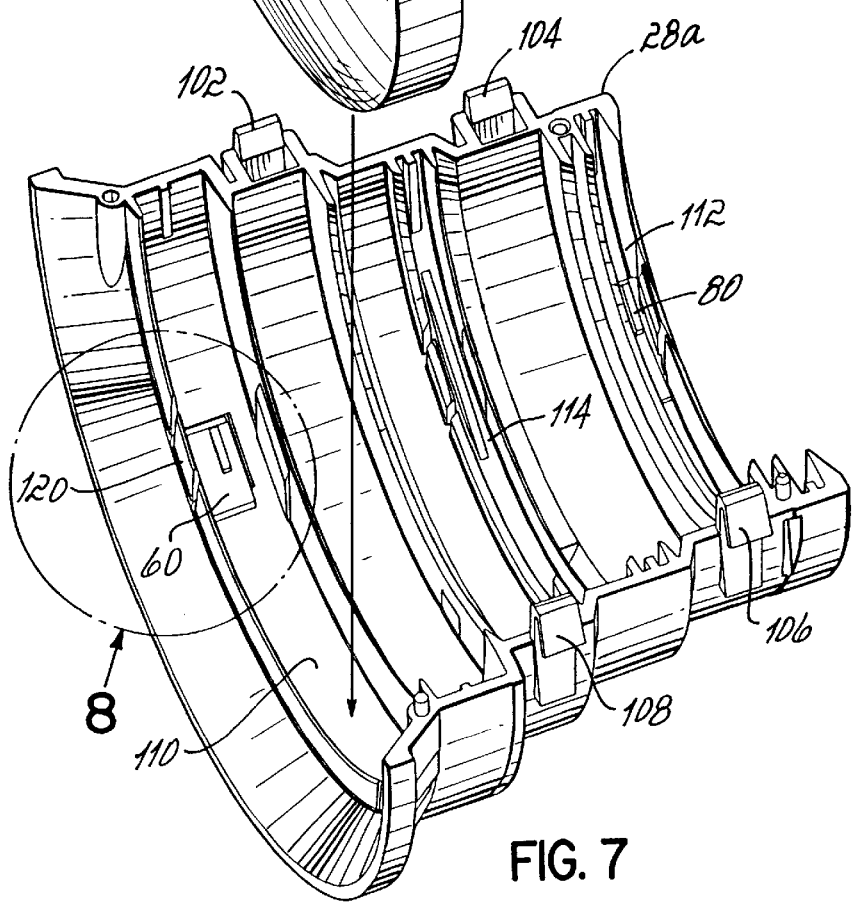
FIG. 7 is a disassembled perspective view showing one half of the optic support structure or lens cell and one optic being inserted therein.

Turning now to FIGS. 7 and 8, assembly of the optics 30, 32, 34 within the lens cell 28 will be understood, although various elements are deleted for clarity. Lens cell 28 more specifically comprises two halves, with one half 28a being shown in FIG. 7 and the other half being of identical design. The two halves are snapped together with hook-like snap fasteners 102, 104, 106, 108. Three grooves 110, 112, 114 are provided for respectively retaining the circumferential edges of optics 30, 32, 34. Lens cell 28 is generally cylindrical and grooves 110, 112, 114 are generally circular, however, these shapes may be altered into other types of tubular and annular shapes depending on the design of the optics or other considerations. In this embodiment, only grooves 110 and 112 include the flexible tab members as described above, since the glass optic 34 which is contained in groove 114 will not undergo any significant thermal expansion during use. It will be understood, however, that flexible tab members or other resilient mounting structure, may be incorporated for optic 34 as this may, for example, assist with lessening the adverse effects of assembly forces. Once all three optics 30, 32, 34 are inserted, as generally illustrated in FIG. 7 with respect to optic 30, the two halves of the lens cell are snapped together and the remainder of lens system 10 may be assembled as shown in FIG. 1. As shown in FIG. 8, another flexible tab member 120 is provided for exerting an axial alignment force on optic 30. The details of this feature are more fully discussed in Applicant's copending patent application Ser. No. 09/855,974 (Express Mail No. EL718727040US), filed on even date herewith, and the disclosure of which is hereby fully incorporated by reference herein.

While the present invention has been illustrated by a description of a preferred embodiment and while this embodiment has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein I claim:

1. An optical lens cell comprising:
    a tubular optic support structure having an interior with a longitudinal central axis and a first annular support surface extending around the longitudinal central axis for receiving a first optic having an outer circumferential edge,
    said first annular support surface including at least a first resilient member configured to contact the outer circumferential edge of the first optic and to be moved in a radially outward direction by said first optic relative to the longitudinal central axis to assist in preventing substantial movement of remaining portions of said tubular optic support structure.

2. The optical lens cell of claim 1, wherein said first annular support surface is positioned within a groove in the interior of said optic support structure.

3. The optical lens cell of claim 1, wherein:
    said interior of said optic support structure further includes a second annular support surface extending around the longitudinal central axis for receiving a second optic having an outer circumferential edge,
    said second annular support surface including at least a second resilient member configured to contact the outer circumferential edge of the second optic and to move in a radially outward direction relative to the longitudinal central axis without substantially moving remaining portions of said tubular optic support structure.

4. The optical lens cell of claim 1, wherein said first resilient member further comprises a first flexible tab member having at least a portion extending inwardly from remaining portions of said first annular support surface and configured to be resiliently biased in the radially outward direction to provide an interference fit when the first optic is contained in said interior of said optic support structure.

5. The optical lens cell of claim 4, wherein said first flexible tab member is a cantilevered member.

6. The optical lens cell of claim 4, wherein said first annular support surface further comprises:
    a second flexible tab member positioned diametrically across from said first flexible tab member and configured to be resiliently biased in the radially outward direction when the first optic is contained in said interior of said optic support structure.

7. The optical lens cell of claim 6, wherein said first annular support surface further comprises:
    third and fourth flexible tab members positioned in diametrically opposed relation to each other and configured to be resiliently biased in the radially outward direction when the first optic is contained in said interior of said optic support structure.

8. The optical lens cell of claim 7, wherein said first and third flexible tab members and said second and fourth flexible tab members are positioned equidistant from each other.

9. A projection television lens system comprising:
    a light source,
    a focus mount coupled with said light source,
    a tubular optic support structure coupled to said focus mount, said optic support structure having an interior with a longitudinal central axis and a first annular support surface extending around the longitudinal central axis and receiving a first optic having an outer circumferential edge, and said optic support structure being movable relative to said focus mount along said longitudinal central axis to provide focus adjustment,
    said first annular support surface including at least a first resilient member configured to contact the outer circumferential edge of said first optic and to move in a radially outward direction relative to the longitudinal central axis to assist in preventing substantial movement of remaining portions of said tubular optic support structure.

10. The projection television lens system of claim 9, wherein said light source is a CRT.

11. The projection television lens system of claim 9, wherein said optic support structure and said focus mount are rotatably secured to one another to provide said focus adjustment.

12. The projection television lens system of claim 9, wherein said first annular support surface is positioned within a groove in the interior of said optic support structure.

13. The projection television lens system of claim 9, wherein:
    said interior of said optic support structure further includes a second annular support surface extending around the longitudinal central axis and receiving a second optic having an outer circumferential edge,
    said second annular support surface including at least a second resilient member contacting the outer circumferential edge of said second optic and configured to be moved in a radially outward direction by said second optic relative to the longitudinal central axis without substantially moving remaining portions of said tubular optic support structure.

14. The projection television lens system of claim 9, wherein said first resilient member further comprises a first flexible tab member having at least a portion extending inwardly from remaining portions of said first annular support surface and configured to be resiliently biased in the radially outward direction to provide an interference fit when the first optic is contained in said interior of said optic support structure.

15. The projection television lens system of claim 14, wherein said first flexible tab member is a cantilevered member.

16. The projection television lens system of claim 14, wherein said first annular support surface further comprises:

a second flexible tab member positioned diametrically across from said first flexible tab member and configured to be resiliently biased in the radially outward direction when the first optic is contained in said interior of said optic support structure.

17. The projection television lens system of claim 16, wherein said first annular support surface further comprises:

third and fourth flexible tab members positioned in diametrically opposed relation to each other and configured to be resiliently biased in the radially outward direction when the first optic is contained in said interior of said optic support structure.

18. The projection television lens system of claim 17, wherein said first and third flexible tab members and said second and fourth flexible tab members are positioned equidistant from each other.

19. A projection television lens system comprising:

a light source, a focus mount coupled with said light source, a generally cylindrical optic support structure coupled to said focus mount, said optic support structure having an interior with a longitudinal central axis and a first annular support surface extending around the longitudinal central axis and receiving a first optic having an outer circumferential edge, and said optic support structure being movable relative to said focus mount along said longitudinal central axis to provide focus adjustment, said first annular support surface including at least four flexible tab members positioned generally at equidistant spacings from one another and contacting the outer circumferential edge of said first optic, said flexible tab members further configured to be moved in a radially outward direction by said first optic relative to the longitudinal central axis to assist in preventing substantial movement of remaining portions of said tubular optic support structure during assembly and use of said lens system.

20. A projection television lens assembly comprising:

a molded plastic tube having an interior surface, a plurality of optics mounted in said tube with a circumferential edge of at least a first one of said optics positioned adjacent said interior surface, and a plurality of spaced apart resilient members integral with the interior surface of said tube and bearing against the circumferential edge of said first optic, with remaining portions of said circumferential edge being spaced apart from the interior surface of said tube.

21. The projection television lens assembly of claim 20, wherein said resilient members are cantilevered tabs.

22. The projection television lens assembly of claim 21, wherein said cantilevered tabs are spaced equally around said first optic.

* * * * *